United States Patent
Bockus et al.

(10) Patent No.: US 8,132,109 B2
(45) Date of Patent: Mar. 6, 2012

(54) WEBPAGE MAGNIFIER/FORMATTER USING CSS PROPERTIES AND CURSOR/MOUSE LOCATION

(75) Inventors: Michael Andrew Bockus, Manor, TX (US); John Patrick Keane, Minneapolis, MN (US); Kevin Robert Sawicki, Stormville, NY (US)

(73) Assignee: International Business Machines Corporation, Armonk, NY (US)

( * ) Notice: Subject to any disclaimer, the term of this patent is extended or adjusted under 35 U.S.C. 154(b) by 301 days.

(21) Appl. No.: 12/466,762

(22) Filed: May 15, 2009

(65) Prior Publication Data

US 2010/0293510 A1  Nov. 18, 2010

(51) Int. Cl.
G06F 3/00 (2006.01)
G06F 15/173 (2006.01)

(52) U.S. Cl. ................ 715/746; 715/760; 709/246

(58) Field of Classification Search .............. 715/746, 715/760; 709/246
See application file for complete search history.

(56) References Cited

U.S. PATENT DOCUMENTS

| 6,704,034 | B1 | 3/2004 | Rodriguez et al. | 715/860 |
| 6,959,340 | B1 * | 10/2005 | Najmi | 709/246 |
| 7,062,723 | B2 | 6/2006 | Smith et al. | 715/860 |
| 7,194,411 | B2 | 3/2007 | Slotznick et al. | 704/271 |
| 7,461,353 | B2 * | 12/2008 | Rohrabaugh et al. | 715/815 |
| 7,949,642 | B2 * | 5/2011 | Yang et al. | 707/706 |
| 2003/0002070 | A1 * | 1/2003 | Brown et al. | 358/1.15 |
| 2004/0176967 | A1 * | 9/2004 | Whittenberger | 705/1 |
| 2006/0277476 | A1 * | 12/2006 | Lai | 715/760 |
| 2008/0005661 | A1 | 1/2008 | Yao et al. | 715/700 |
| 2010/0315326 | A1 * | 12/2010 | Le Chevalier et al. | 345/107 |
| 2011/0072390 | A1 * | 3/2011 | Duga et al. | 715/800 |

OTHER PUBLICATIONS

Ian Blackham, Free Web Development Tools: The Accessibility Toolbar Version 1.0. Copyright © 2004 DMXzone.com.
"How to create a custom personal stylesheet for Firefox browsers," Wiz's Computer and Website Security Blog, <retrieved on Aug. 18, 2008>.
Fernandez, "Web site Accessibility," 58 All, 2001.

* cited by examiner

*Primary Examiner* — William Bashore
*Assistant Examiner* — David Phantana Angkool
(74) *Attorney, Agent, or Firm* — Van Leeuwen & Van Leeuwen; Jill A. Poimboeuf

(57) ABSTRACT

An approach is provided that receives web page data at a network adapter included in an information handling system. A process identifies a first set style sheets that apply to the web page data and a second set of style sheets that apply to graphical elements that are within a predefined proximity area of a cursor that is displayed on the information handling system's display screen. The process displays graphical elements that are outside the predefined proximity area using the first set of style sheets and simultaneously displays a second set of elements that are within the predefined proximity area using the second set of style sheets.

14 Claims, 7 Drawing Sheets

_US 8,132,109 B2_

WEBPAGE MAGNIFIER/FORMATTER USING CSS PROPERTIES AND CURSOR/MOUSE LOCATION

BACKGROUND OF THE INVENTION

1. Technical Field

The present invention relates to applying style-sheets to web pages based on the current location of the cursor.

2. Description of the Related Art

Web developers determine the level of accessibility enjoyed by visitors to their sites. In order to provide a high level of accessibility for all users, developers take user disabilities into account during the design phase. For visually impaired users, providing magnification aids in their ability to view displayed data. While some tools and software exist to magnify portions of the user's screen, the current tools do not provide user-customization capabilities that better address the individual user's particular visual impairment.

SUMMARY

An approach is provided that receives web page data at a network adapter included in an information handling system. A process identifies a first set style sheets that apply to the web page data and a second set of style sheets that apply to graphical elements that are within a predefined proximity area of a cursor that is displayed on the information handling system's display screen. The process displays graphical elements that are outside the predefined proximity area using the first set of style sheets and simultaneously displays a second set of elements that are within the predefined proximity area using the second set of style sheets.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
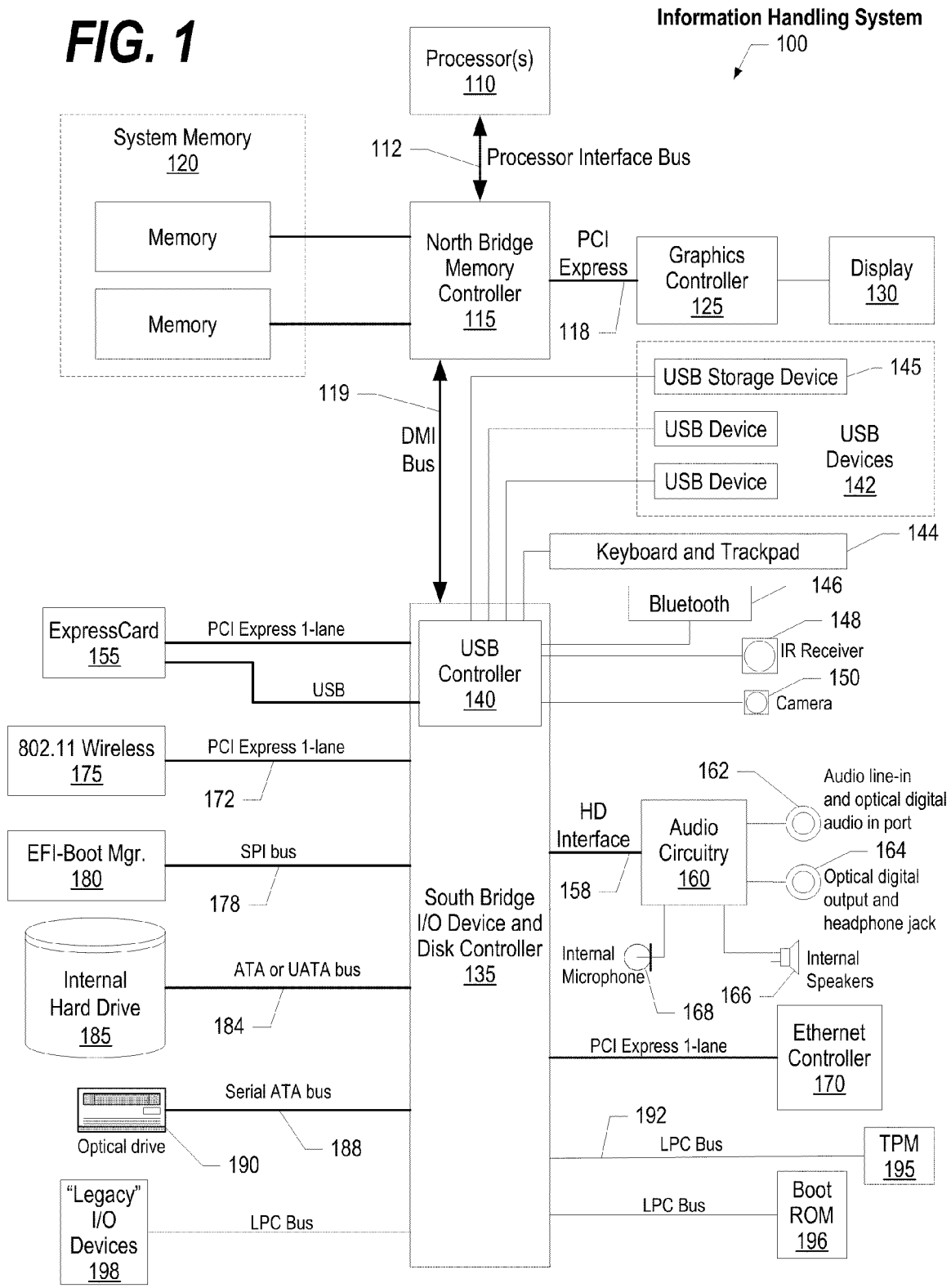
FIG. 1 is a block diagram of a data processing system in which the methods described herein can be implemented.
Figure 2:
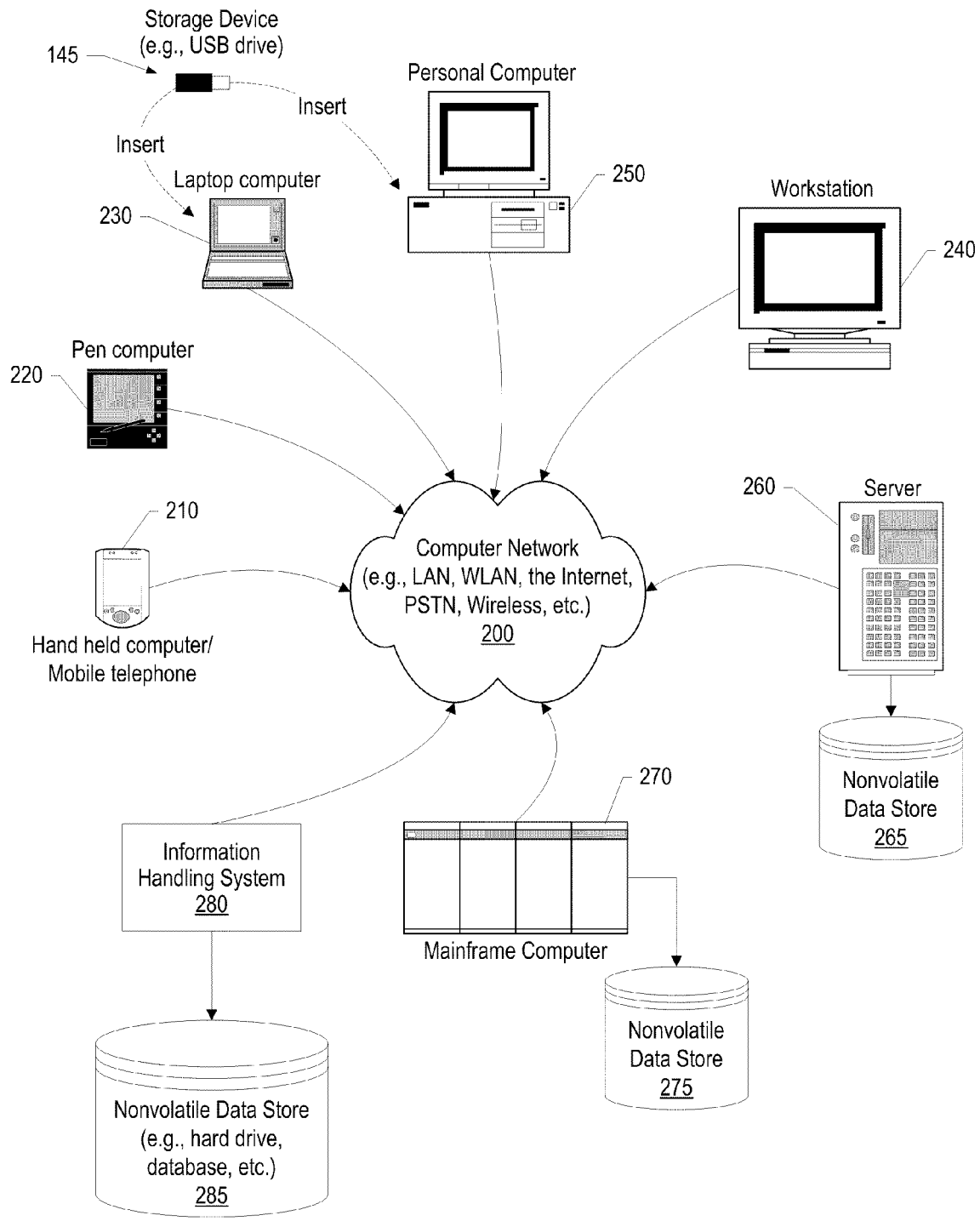
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
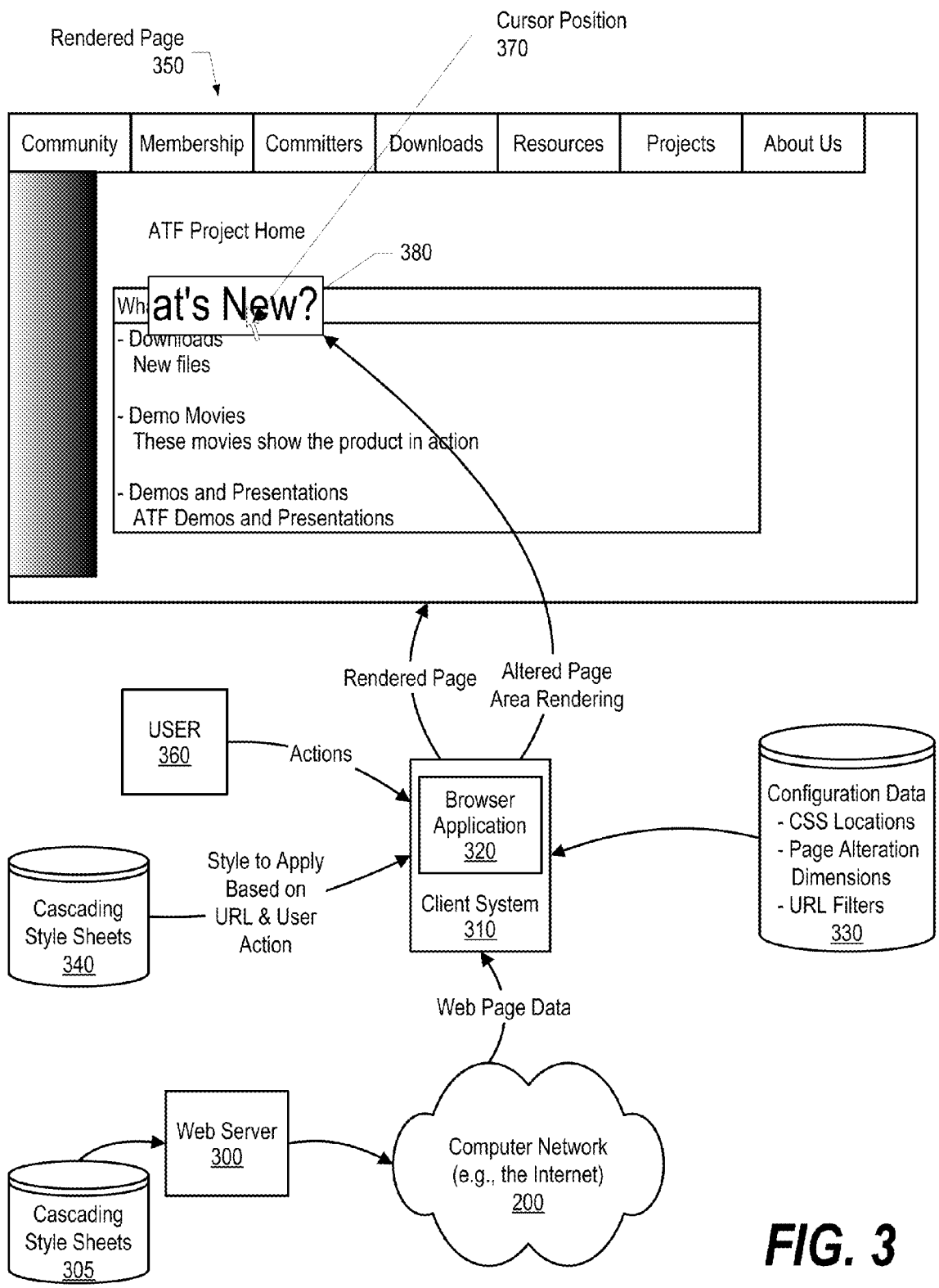
FIG. 3 is a high level diagram showing a client system gathering user preferences and corresponding style sheets to display a formatted area within a web page.

FIG. 3 is a high level diagram showing a client system gathering user preferences and corresponding style sheets to display a formatted area within a web page. Web server 300 sends web page data to client information handling system 310 (e.g., a computer system) via computer network 200 (e.g., the Internet). Client system 310 executes a browser application (e.g., Microsoft Internet Explorer™, Mozilla Foundation's Firefox™, etc.). to render pages on a display connected or included with the client information handling system. User 360 performs actions, such as moving a mouse or other input device that causes cursor 370 to move positions on the screen.

As shown, rendered page 350 includes various graphical elements, such as text, icons, pictures, and other graphic renderings. Prior to rendering the page, configuration data 330 is provided (e.g., by user 360) that identifies locations of additional location-based cascading style sheets, page alteration dimensions (e.g., in pixels), and URL filters that determine which URLs (web addresses) are handled using one or more of cascading style sheets 340. While cascading style sheets 340 are shown be stored locally, these style sheets can be stored in network-accessed locations. In addition, the web server that supplies the web page data also supplies cascading style sheets 305. However, style sheets 340, as indicated, provide styles (e.g., formatting) to apply to graphical elements based on the URL (web address) being accessed as well as the user action being performed. In the example shown, the user has positioned cursor at a particular location within rendered page 350 which causes graphical elements within a predetermined proximity to be displayed using cascading style sheets 340 resulting in magnified image 380. This magnified image is due to the identified cascading style sheet that was applied to the elements proximate to cursor 370 with larger font styles. Any other formatting that can be applied using style sheets can be applied in addition or in lieu of larger font styles. For example, a color-blind user can set up cascading style sheets 340 to change graphic element colors from red and green to black (e.g., in the case of a person that is red/green color blind).

Figure 4:
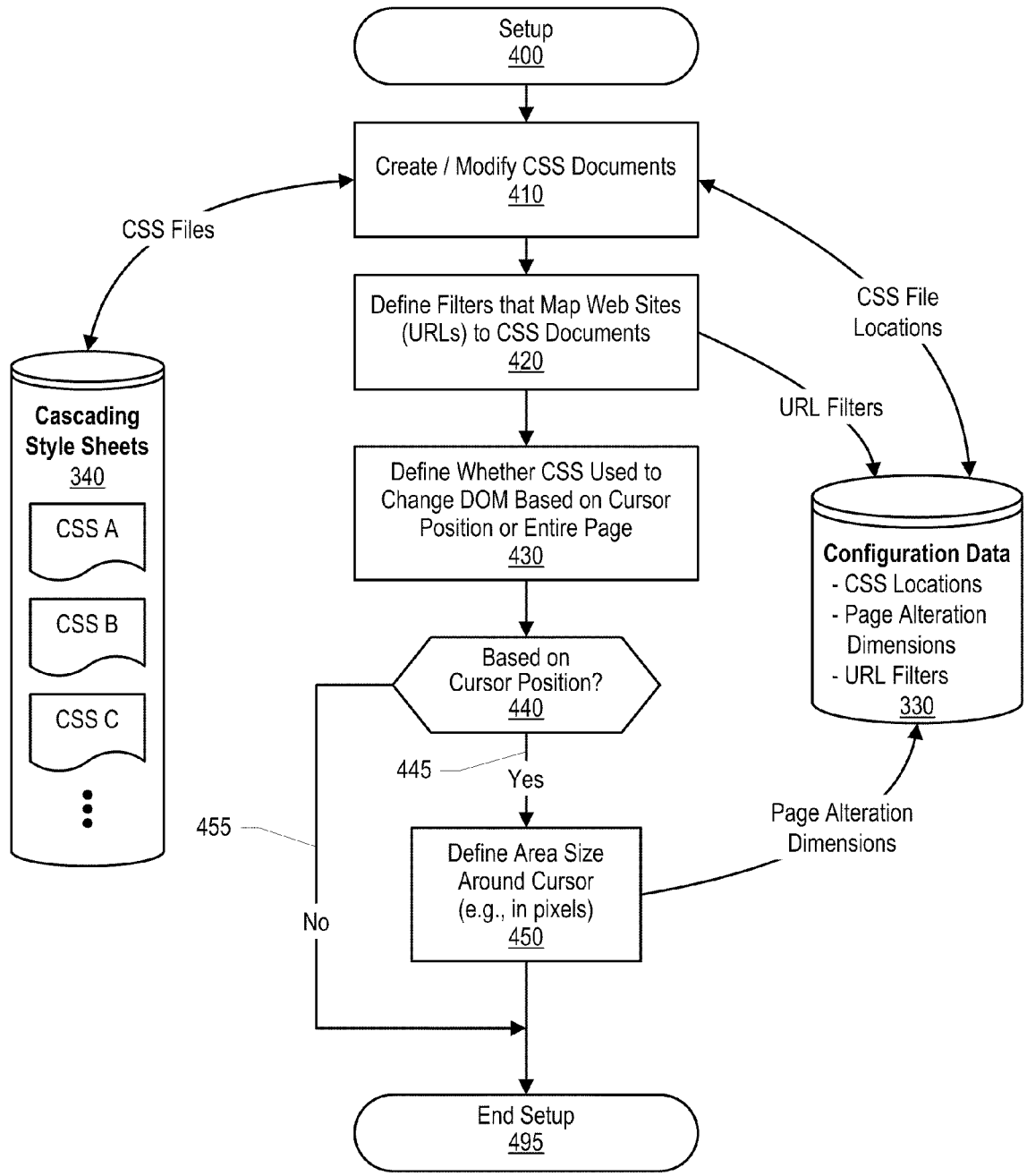
FIG. 4 is a flowchart showing the setup of configuration of altered page dimensions, URL filters, and cascading style sheets.

FIG. 4 is a flowchart showing the setup of configuration of altered page dimensions, URL filters, and cascading style sheets. Processing commences at 400 whereupon, at step 410, the user requests to create a new cascading style sheet or modify an existing cascading style sheet. Locations of where style sheets are stored is saved in configuration data store 330 (e.g., on a locally-accessed nonvolatile storage device accessible from the user's information handling system, on a remote, network-accessible storage (NAS) device, etc.).

At step 420, the user interacts with setup processing and defines filters, if any, that are applied to the CSS style sheets. For example, the user can set up CSS A (shown in style sheets 340) to be applied when pages from any "ibm.com" web site are encountered, and CSS B to be applied when web pages from any news related web sites (e.g., cnn.com, bloomberg.com, etc.) are encountered, and CSS C to be applied when various shopping and entertainment sites are encountered (e.g., amazon.com, buy.com, etc.). In this manner, the user can control what enhanced formatting is performed based on the web site that is accessed, rather than having defined formatting applied to each site that the user accesses. In addition, wildcard characters can be used so that many web addresses fall within the filter, such as "*.*" for all web sites, "*.com" for all ".com" web sites, etc. These URL filters are also stored in configuration data store 330.

At step 430, the user defines whether the style sheet that is being defined (e.g., CSS A) applies to entire web pages or if the CSS is applied based on the user's cursor position within the page. A determination is made as to whether the style sheet is applied based on the user's cursor position (decision 440). If the style sheet is applied based on the user's cursor position, then decision 440 branches to "yes" branch 445 whereupon, at step 450 the user defines the proximity area (e.g., in pixels) and these page alteration dimensions are stored in configuration data store 330. This page alteration dimension is used as the predefined proximity area of a cursor when the cursor is on the web page. Graphical elements within this predefined proximity area are rendered using the identified style sheet (e.g., CSS A), while those outside the predefined proximity area are rendered using other style sheets (e.g., the style sheets sent by the web server to display the data, style sheets defined by the user to display data outside the proximity area, etc.). Returning to decision 440, if the style sheet being defined by the user is not applied based on the user's cursor position, then decision 440 branches to "no" branch 455 bypassing step 450. Using the setup process described above, a user with multiple visual needs can address each of these visual needs using style sheets. A color-blind and visually impaired user that needs magnification can set up one style sheet (e.g., CSS A) that renders colors not easily seen by the user due to the user's color-blindness and another style sheet (e.g., CSS B) that renders elements within a predetermined proximity of the user's cursor in both a larger font as well as using colors that the user can better see (e.g., black instead of red/green, etc.). Style sheet locations, URL filters, and page alteration dimensions (the predefined proximity area) are stored in configuration data store 330. Setup processing then ends at 495.

Figure 5:
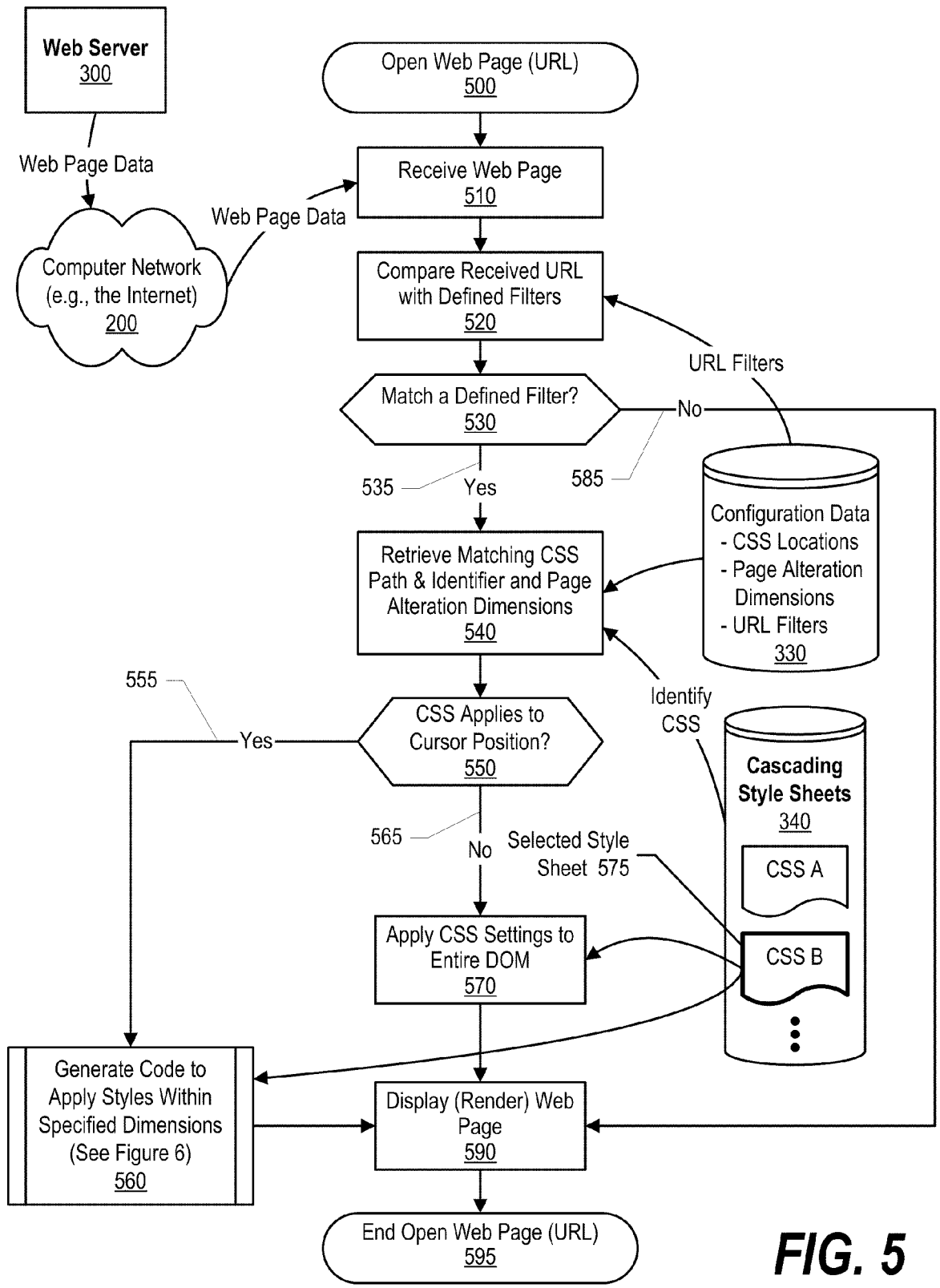
FIG. 5 is a flowchart showing steps taken when a user opens a web page after configuring the altered page dimensions, URL filters, and cascading style sheets shown in FIG. 4.

FIG. 5 is a flowchart showing steps taken when a user opens a web page after configuring the altered page dimensions, URL filters, and cascading style sheets shown in FIG. 4. Processing commences at 400 whereupon, at step 510, the user receives web page data from web server 300 via computer network 200 (e.g., the Internet). At step 520, the web address (URL) from which the data was received is compared to defined web address filters stored in configuration data store 330. A determination is made as to whether the web address corresponding to the received web data matches any of the defined filters (decision 530). If the web address matches a defined filter, then decision 530 branches to "yes" branch 535 whereupon, at step 540, the location (e.g., path, filename, etc.) of the style sheet for this web address filter are retrieved as well as any page alteration dimensions (predefined proximity area) from configuration data store 330.

A determination is made as to whether the identified style sheet applies to the cursor position or to the entire page (decision 550). If the identified style sheet applies to the cursor position, then decision 550 branches to "yes" branch 555 whereupon, at predefined process 560, processing generates the code that is used to apply selected style sheet 575 (e.g., CSS B) to elements within the predefined proximity area (e.g., within area defined in pixels around the cursor). See FIG. 6 and corresponding text for processing details regarding the generation of code to apply styles within the predefined proximity area. Returning to decision 550, if the identified style sheet applies to the entire page and not to an predefined proximity area of the cursor, then decision 550 branches to "no" branch 565 whereupon, at step 570, selected style sheet 575 (e.g., CSS B) is retrieved from cascading style sheet data store 340 and applied to the entire document object model (DOM) rather than to a particular area around the cursor.

At step 590, the web page is rendered using the retrieved style sheet(s), either applied to the entire page or to an area proximate to the cursor. Processing used to open the web page ends at 595.

Figure 6:
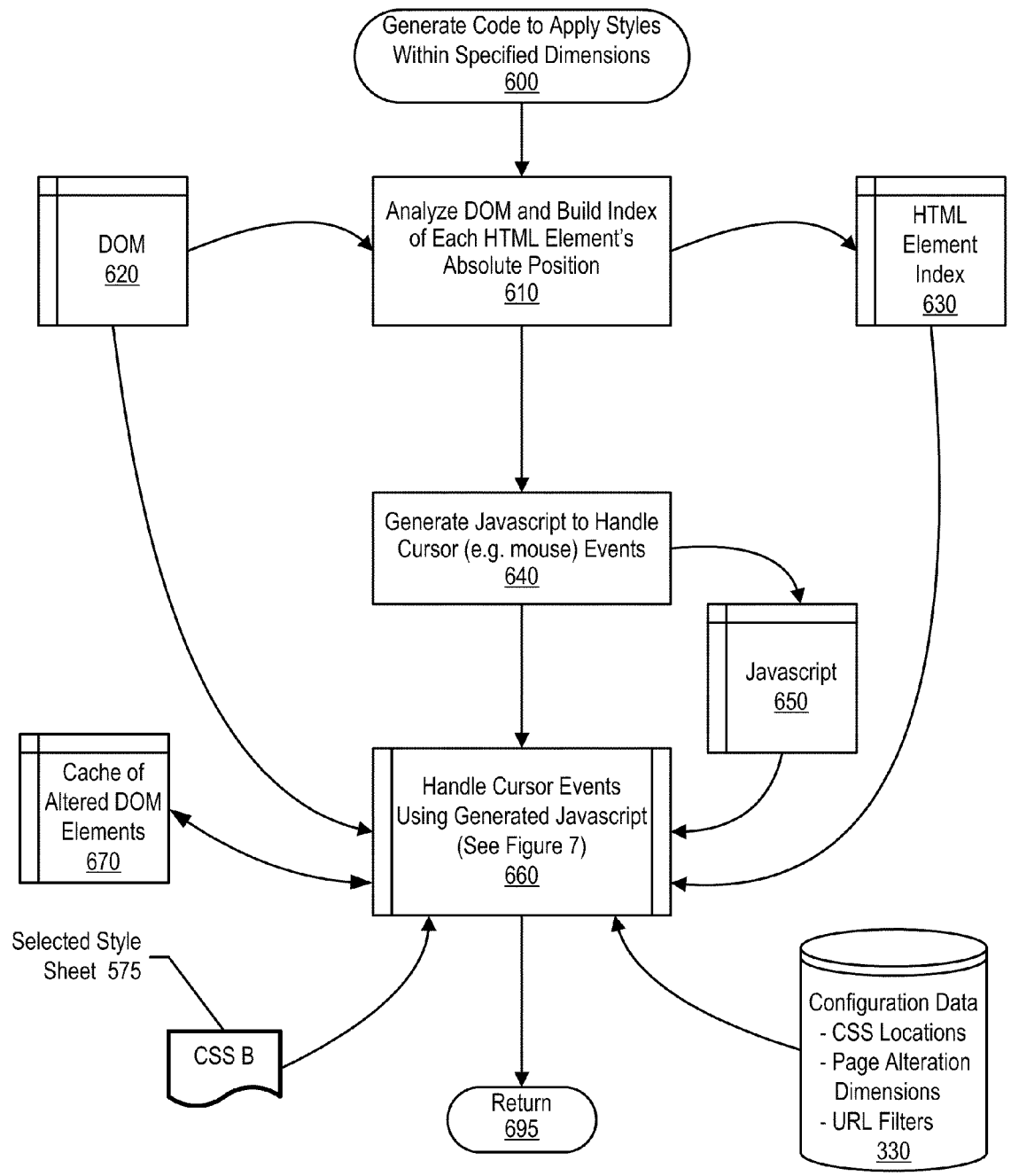
FIG. 6 is a flowchart showing steps taken by the software process that generates the code used to apply the selected styles within the user-specified set of page dimensions.

FIG. 6 is a flowchart showing steps taken by the software process that generates the code used to apply the selected styles within the user-specified set of page dimensions. Processing commences at 600 whereupon, at step 610, the document object model (DOM 620) which comprises the web page data sent from the server is analyzed. This analysis results in HTML element index 630 which is an index that is built with the absolute position (e.g., location) of each element in the web page (e.g., all graphical elements of text, icons, graphics, pictures, etc. are analyzed). At step 640, computer instructions 650 (e.g., Javascript code) are generated to handle cursor events that occur when the user causes the cursor to move to a different area.

Figure 7:
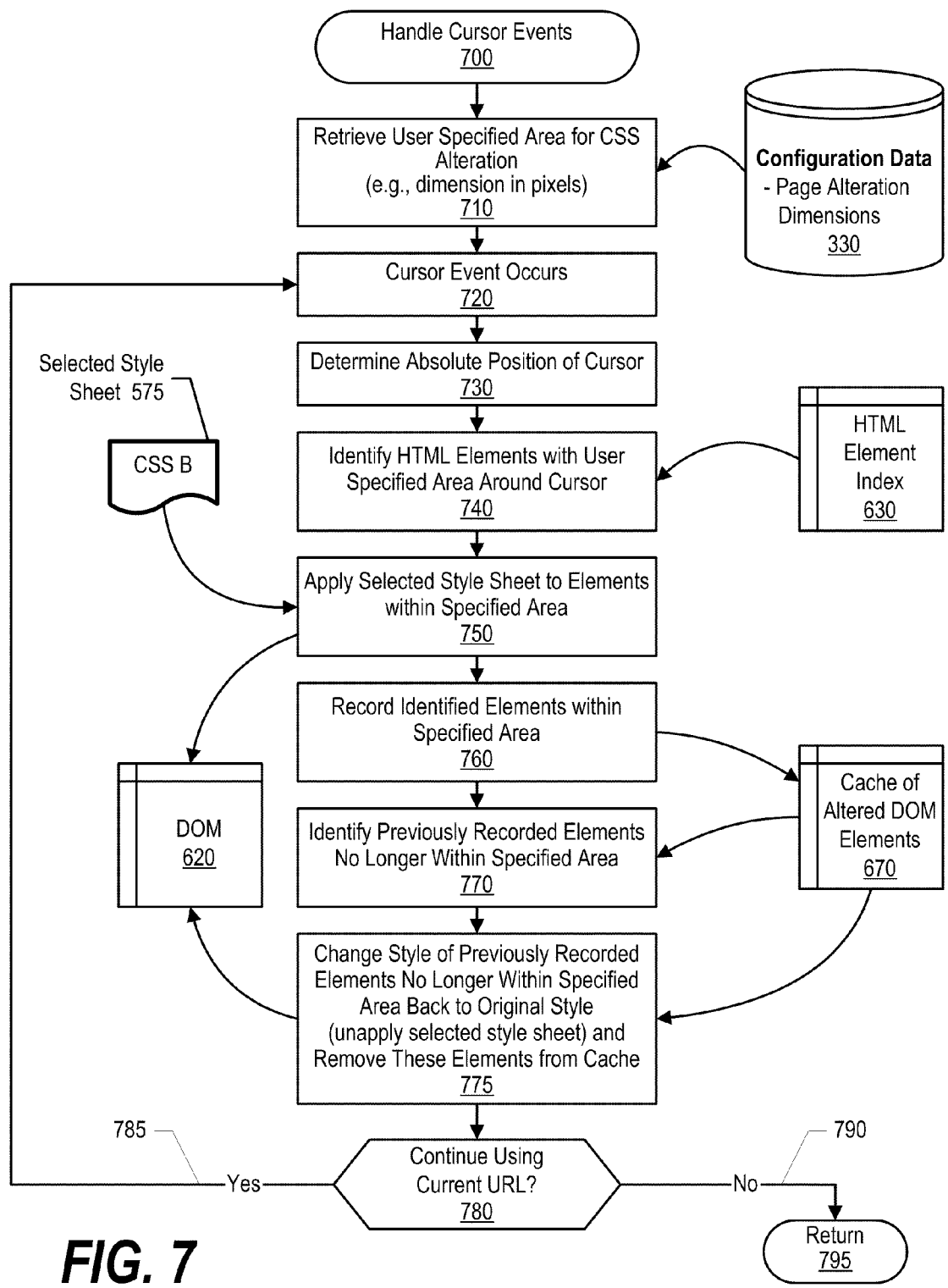
FIG. 7 is a flowchart showing steps taken by the generated code to handle cursor events initiated by the user.

When cursor events occur, the generated computer instructions are used to handle the events (predefined process 660, see FIG. 7 and corresponding text for processing details). Predefined process 660 identifies graphical elements (e.g., HTML elements) that are within the predefined proximity area stored in configuration data store 330. When such graphical elements are identified, the processing shown in FIG. 7 operates to apply the identified style sheet 575 to those graphical elements. A reference to each of the graphical elements that are within the predefined proximity area is stored in memory cache 670. When elements with references stored in memory cache 670 are no longer in the predefined proximity area, then predefined process 660 operates to remove selected style sheet 575 from those elements. For example, if CSS B is a style that provides larger font sizes for a given proximity area, then a first set of elements (e.g., text) within the proximity area have the larger font size applied as specified by selected style sheet 575 and a reference to the element is stored in memory cache 670. When the user moves to cursor over a different area of the web page, then the first set of elements has selected style sheet 575 removed so that the first set of elements are no longer formatted using the larger font size. A second set of elements proximate to the new cursor location is then identified and selected style sheet 575 is applied to this second set of elements providing larger font sizes to these elements. Predefined process 660 continues until the user changes web addresses (e.g., navigates to a different page), at which point processing returns to the calling routine at 695 (see FIG. 5).

FIG. 7 is a flowchart showing steps taken by the generated code to handle cursor events initiated by the user. Processing commences at 700 whereupon, at step 710, the predefined proximity area (e.g., the area specified for style sheet alteration specified in pixels) is retrieved from configuration data store 330. At step 720, a cursor event occurs where the user causes the cursor to move on the display (e.g., by moving a mouse or other input device that controls cursor movement). At step 730, the absolute position of the cursor is determined. At step 740, the graphical elements are identified that are within the predefined proximity area of the cursor. The graphical elements are identified by comparing the cursors position (found in step 730) to the position of the graphical elements stored in element index 630.

At step 750, selected style sheet 575 (e.g., CSS B in the example) is applied to elements that were identified in step 740 as being within the predefined proximity area. At step 760, identifiers (e.g., references) that correspond to the identified graphical elements are recorded (stored) in memory cache 670. At step 770, memory cache 670 is read in order to identify any graphical elements that are no longer within the predefined proximity area, indicating that the elements have had selected style sheet 575 applied to them, but are no longer within the proximity area defined by the user. At step 775, selected style sheet 575 is removed (no longer applied) to these graphical elements. For example, if selected style sheet 575 increases font sizes of these elements, then the font sizes are reduced back to the original size because selected style sheet 575 is no longer applied to these elements.

A determination is made as to whether the user continues using the current web address, or URL (decision 780). If the user continues using the current web address, then decision 780 branches to "yes" branch 785 which loops back to capture the next cursor event that occurs and process the application and removal of selected style sheet 575 according to the aforementioned steps. This looping continues while the user uses the current style sheet. When the user stops using the current style sheet (e.g., navigates to a different web page), then decision 780 branches to "no" branch 790 and processing returns to the calling routine at 795 (see FIG. 6).

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method executing on an information handling system comprising:

receiving web page data at a network adapter included in the information handling system; retrieving a web address (URL) that provided the web page data; identifying a first set of one or more style sheets that apply to the web page data;

identifying a second set of one or more style sheets that apply to graphical elements that are within a predefined proximity area of a cursor that is displayed on a display screen accessible to the information handling system, wherein identifying the second set of style sheets comprises selecting the second set of style sheets from a plurality of style sheets based on the retrieved web address;

displaying a first set of one or more graphical elements on the display screen using the first set of one or more style sheets, wherein each of the first set of graphical elements is outside the predefined proximity area;

simultaneously displaying a second set of one or more graphical elements on the display screen using the identified second set of style sheets, wherein each of the second set of graphical elements is within the predefined proximity area;

receiving a signal that the cursor has changed positions on the display screen;

identifying one or more of the graphical elements included in the second set that are no longer within the predefined proximity area; and displaying the identified one or more graphical elements that are no longer within the predefined proximity area using the first set of one or more style sheets.

2. The method of claim 1 further comprising:

creating an HTML element index that includes an actual displayed position for each of the displayed first set of graphical elements; and generating a plurality of computer instructions to handle cursor events that occur when a user causes the cursor to move an area of the display screen that is used to display the first and second set of graphical elements.

3. The method of claim 1 wherein the authenticating further comprises:

comparing a position of the cursor with one or more predefined areas on the display screen;

in response to the position being within one of the predefined areas:

generating a plurality of instructions that apply the second set of style sheets to the second set of graphical elements; and handling cursor events caused when a user moves a selection device using the generated plurality of instructions.

4. The method of claim 3 further wherein the generated instructions are interpreted script instructions that are executed by a web browser software application used to display the first and second sets of graphical elements on the display screen.

5. The method of claim 3 further comprising:

analyzing a document object model (DOM) that includes the web page data that includes a plurality of HTML elements; and building an index of an absolute position of each of the plurality of HTML elements, wherein the generated plurality of instructions compare the position of the cursor with the absolute positions stored in the index.

6. An information handling system comprising:

one or more processors;

a memory coupled to at least one of the processors;

a nonvolatile storage area coupled to at least one of the processors;

a network adapter that connects the information handling system to a computer network; and a set of instructions stored in the memory and executed by at least one of the processors in order to perform actions of:

receiving web page data at a network adapter included in the information handling system;

retrieving a web address (URL) that provided the web page data;

identifying a first set of one or more style sheets that apply to the web page data;

identifying a second set of one or more style sheets that apply to graphical elements that are within a predefined proximity area of a cursor that is displayed on a display screen accessible to the information handling system, wherein identifying the second set of style sheets comprises selecting the second set of style sheets from a plurality of style sheets based on the retrieved web address;

displaying a first set of one or more graphical elements on the display screen using the first set of one or more style sheets, wherein each of the first set of graphical elements is outside the predefined proximity area;

simultaneously displaying a second set of one or more graphical elements on the display screen using the identified second set of style sheets, wherein each of the second set of graphical elements is within the predefined proximity area;

receiving a signal that the cursor has changed positions on the display screen;

identifying one or more of the graphical elements included in the second set that are no longer within the predefined proximity area; and displaying the identified one or more graphical elements that are no longer within the predefined proximity area using the first set of one or more style sheets.

7. The information handling system of claim 6 including additional actions comprising:

creating an HTML element index that includes an actual displayed position for each of the displayed first set of graphical elements; and generating a plurality of computer instructions to handle cursor events that occur when a user causes the cursor to move an area of the display screen that is used to display the first and second set of graphical elements.

8. The information handling system of claim 6 wherein the authenticating further comprises additional actions of:

comparing a position of the cursor with one or more predefined areas on the display screen;

in response to the position being within one of the predefined areas:

generating a plurality of instructions that apply the second set of style sheets to the second set of graphical elements; and handling cursor events caused when a user moves a selection device using the generated plurality of instructions.

9. The information handling system of claim 8 further wherein the generated instructions are interpreted script instructions that are executed by a web browser software application used to display the first and second sets of graphical elements on the display screen.

10. A computer program product stored in a computer readable medium, comprising functional descriptive material that, when executed by an information handling system, causes the information handling system to perform actions comprising:

receiving web page data at a network adapter included in the information handling system;

retrieving a web address (URL) that provided the web page data; identifying a first set of one or more style sheets that apply to the web page data;

identifying a second set of one or more style sheets that apply to graphical elements that are within a predefined proximity area of a cursor that is displayed on a display screen accessible to the information handling system, wherein identifying the second set of style sheets comprises selecting the second set of style sheets from a plurality of style sheets based on the retrieved web address;

displaying a first set of one or more graphical elements on the display screen using the first set of one or more style sheets, wherein each of the first set of graphical elements is outside the predefined proximity area;

simultaneously displaying a second set of one or more graphical elements on the display screen using the identified second set of style sheets, wherein each of the second set of graphical elements is within the predefined proximity area;

receiving a signal that the cursor has changed positions on the display screen;

identifying one or more of the graphical elements included in the second set that are no longer within the predefined proximity area; and displaying the identified one or more graphical elements that are no longer within the predefined proximity area using the first set of one or more style sheets.

11. The computer program product of claim 10 further comprising additional functional descriptive material that, when executed by the information handling system, causes the information handling system to perform additional actions comprising:

creating an HTML element index that includes an actual displayed position for each of the displayed first set of graphical elements; and generating a plurality of computer instructions to handle cursor events that occur when a user causes the cursor to move an area of the display screen that is used to display the first and second set of graphical elements.

12. The computer program product of claim 10 wherein the authenticating further comprising additional functional descriptive material that, when executed by the information handling system, causes the information handling system to perform additional actions comprising:

comparing a position of the cursor with one or more predefined areas on the display screen;

in response to the position being within one of the predefined areas:

generating a plurality of instructions that apply the second set of style sheets to the second set of graphical elements; and handling cursor events caused when a user moves a selection device using the generated plurality of instructions.

13. The computer program product of claim 12 further wherein the generated instructions are interpreted script instructions that are executed by a web browser software application used to display the first and second sets of graphical elements on the display screen.

14. The computer program product of claim 12 further comprising additional functional descriptive material that, when executed by the information handling system, causes the information handling system to perform additional actions comprising:

analyzing a document object model (DOM) that includes the web page data that includes a plurality of HTML elements; and building an index of an absolute position of each of the plurality of HTML elements, wherein the generated plurality of instructions compare the position of the cursor with the absolute positions stored in the index.

\* \* \* \* \*